UNITED STATES PATENT OFFICE.

CHARLES E. YAGER, OF HUDSON, NEW YORK.

IMPROVEMENT IN FLUXES FOR SOLDER.

Specification forming part of Letters Patent No. 139,490, dated June 3, 1873; application filed February 8, 1873.

*To all whom it may concern:*

Be it known that I, CHARLES E. YAGER, of the city of Hudson, in the county of Columbia and State of New York, have invented a certain compound which I denominate "Yager's Soldering Salt," to be used instead of muriatic acid, as a flux in soldering tin, brass, copper, and other metals, of which the following is a specification:

The nature of my invention consists in converting metallic zinc into a granular muriatic salt by dissolving the metal in muriatic acid, and then evaporating the acid and treating the residuum with muriate of ammonia (sal-ammoniac) to render it more porous and disintegrable.

To prepare this compound for use as a soldering-salt, I take muriatic acid of twenty per cent. proof and dissolve as much metallic zinc in it as it will take up or dissolve; then put the whole into a shallow pan, and, applying heat, evaporate the acid until the residuum becomes like a thick sirup. It may now, at this stage of the manufacture, be dried and pulverized, or be granulated and used for soldering, but it soon solidifies or loses its granular character, and requires to be again pulverized to be used. To complete the process of manufacture, I add to this thick sirupy or soft residuum before mentioned, powdered muriate of ammonia, (sal-ammoniac) in about the proportion of one pound to the one hundred pounds of the residuum. This I do before removing it from the heat. Immediately afterward I remove it, and stir it until it granulates and becomes sufficiently dry not to harden or solidify again. I then put it into an earthen pot or jar and cover it from the air, letting it stand a day or two, when I remove it, and, if necessary, pulverize until of the consistency of fine salt or well-pulverized brown sugar, when I bottle it ready for use.

To use it for soldering, it is only necessary to mix it with water in the proportion of one teaspoonful of the salt to twelve of water for bright or clean tin-work, and for brass, copper, galvanized iron, &c., it should be made a little stronger by reducing the proportion of water or increasing the salt. This soldering-salt possesses many advantages: It is dry, not bulky, and easily and quickly prepared for use; these are evident from the above description. It is free from odor, does not tarnish tin, and does not, like acid, injure the eyes, nose, mouth or lungs, by its deleterious fumes in using. It leaves the tin brighter and cleaner than acid. It causes the solder to flow more freely, thus requiring less to do the same amount of work. It does not injure the soldering-irons, (coppers,) and an iron tinned with it will wear longer and work better than with anything else.

I am aware that a soldering salt or flux prepared by the solution of zinc in muriatic acid and an admixture of sal-ammoniac is not new, broadly considered, either as an article of commerce, or as a preparation used in the manufacture of solder. But it has always been used impregnated with the muriatic acid, which not only tarnishes the metal, but also evolves deleterious vapors on applying the heated copper. My invention removes these objections by evaporating the acid and furnishing a dry flux free therefrom.

I claim as my invention—

As a new article of manufacture, a dry granulated soldering salt or flux prepared by first dissolving zinc in muriatic acid, then expelling the acid by evaporation, and finally adding sal-ammoniac, substantially as specified.

CHAS. E. YAGER.

Witnesses:
WHEELER H. CLARKE,
EDWARD P. MAGOUN.